United States Patent
Ingmarsson

(10) Patent No.: US 9,959,864 B1
(45) Date of Patent: May 1, 2018

(54) LOCATION-BASED VOICE QUERY RECOGNITION

(71) Applicant: Google LLC, Mountain View, CA (US)

(72) Inventor: Carl-Anton Ingmarsson, Zurich (CH)

(73) Assignee: Google LLC, Mountain View, CA (US)

( * ) Notice: Subject to any disclaimer, the term of this patent is extended or adjusted under 35 U.S.C. 154(b) by 0 days. days.

(21) Appl. No.: 15/336,056

(22) Filed: Oct. 27, 2016

(51) Int. Cl.
| | |
|---|---|
| G10L 15/00 | (2013.01) |
| G10L 15/187 | (2013.01) |
| G10L 25/15 | (2013.01) |
| G10L 15/01 | (2013.01) |
| G10L 15/18 | (2013.01) |
| G10L 15/30 | (2013.01) |

(52) U.S. Cl.
CPC .......... *G10L 15/187* (2013.01); *G10L 15/01* (2013.01); *G10L 15/1815* (2013.01); *G10L 15/30* (2013.01); *G10L 25/15* (2013.01)

(58) Field of Classification Search
USPC .................... 704/246, 247, 251, 252, 257
See application file for complete search history.

(56) References Cited

U.S. PATENT DOCUMENTS

| | | | |
|---|---|---|---|
| 7,865,362 B2 | 1/2011 | Braho et al. | |
| 8,521,526 B1 | 8/2013 | Lloyd et al. | |
| 8,812,316 B1 | 8/2014 | Chen | |
| 9,646,025 B2 * | 5/2017 | Boyns | G06F 17/30241 |
| 2004/0186714 A1 | 9/2004 | Baker | |
| 2007/0255552 A1 | 11/2007 | Thiesson et al. | |
| 2008/0091443 A1 | 4/2008 | Strope et al. | |
| 2009/0037174 A1 | 2/2009 | Seltzer et al. | |
| 2010/0076968 A1 * | 3/2010 | Boyns | G06F 17/30241 |
| | | | 707/732 |
| 2011/0153324 A1 | 6/2011 | Ballinger et al. | |
| 2012/0245919 A1 | 9/2012 | Aradilla et al. | |
| 2012/0303267 A1 | 11/2012 | Shen et al. | |
| 2013/0080177 A1 | 3/2013 | Chen | |
| 2013/0282645 A1 | 10/2013 | Culbertson et al. | |
| 2014/0278407 A1 * | 9/2014 | Chelba | G10L 15/063 |
| | | | 704/235 |
| 2015/0170639 A1 * | 6/2015 | Milstein | G10L 15/06 |
| | | | 704/244 |
| 2015/0179169 A1 | 6/2015 | John et al. | |
| 2015/0371632 A1 | 12/2015 | Skobeltsyn et al. | |

(Continued)

OTHER PUBLICATIONS

International Search Report and Written Opinion issued in International Application No. PCT/US2017/018934, dated Jun. 27, 2017, 16 pages.

*Primary Examiner* — Leonard Saint Cyr
(74) *Attorney, Agent, or Firm* — Fish & Richardson P.C.

(57) ABSTRACT

In some implementations, systems and methods are capable of performing location-based voice query recognition. Audio corresponding to an utterance of the user and data indicating a location associated with a user are initially received. An initial transcription of the utterance is then obtained. A set of n-grams that are associated with a region are selected for each of multiple regions that are associated with the location. One or more additional candidate descriptions are generated for one or more of the multiple geographic regions. A representative transcription of the utterance is selected for one or more of the multiple geographic regions. The representative transcription is finally provided to an automated speech recognizer.

18 Claims, 4 Drawing Sheets

(56) References Cited

U.S. PATENT DOCUMENTS

2016/0004502 A1    1/2016  Winkelman et al.
2016/0035347 A1    2/2016  Agarwal et al.
2017/0270929 A1*   9/2017  Aleksic .................. G10L 15/26

* cited by examiner

LOCATION-BASED VOICE QUERY RECOGNITION

FIELD

The present specification relates to automated speech recognition.

BACKGROUND

Speech recognition refers to the transcription of spoken words into text using an automated speech recognizer (ASR). In traditional ASR systems, received audio is converted into computer-readable sounds, which are then compared to a dictionary of words that are associated with a given language.

SUMMARY

In general, one innovative aspect of the subject matter described in this specification can be embodied in methods that improve voice recognition accuracy of uncommon location-specific terms that are likely to be misrecognized. For instance, location data associated with a voice query can be used to generate additional candidate transcriptions for the voice query. The additional candidate transcriptions are generated using n-grams that are associated with multiple geographic regions relating to the location.

For example, a neighborhood model can include a collection of n-grams that are determined to be associated with a specific geographic region encompassing the location, whereas a sub-locality model can include a collection of n-grams that are determined to be associated with a larger area encompassing the location. In this regard, a hierarchy of geographic region models can be used to generate alternative candidate transcriptions that are each specific to different geographic regions relating to the location. As a result, an automated speech recognizer (ASR) can use the alternative candidate transcriptions to reduce the number of misrecognitions of location-specific terms.

Implementations may include one or more of the following features. For example, in some implementations, a method includes: receiving (i) audio data corresponding to an utterance of the user, and (ii) data indicating a location associated with a user; obtaining an initial candidate transcription of the utterance; selecting, for each of multiple geographic regions that are associated with the location, a set of n-grams that are associated with a region; for one or more of the multiple geographic regions, generating one or more additional candidate transcriptions based on (i) the initial candidate transcription, and (ii) one or more terms of the set of n-grams that are associated with the region, that do not occur in the initial candidate transcription, and that are indicated as phonetically similar to one or more terms that do occur in the initial candidate transcription; selecting, from among the initial candidate transcription and the one or more additional candidate transcriptions, a representative transcription of the utterance; and providing the representative transcription to an automated speech recognizer.

Other versions include corresponding systems, and computer programs, configured to perform the actions of the methods encoded on computer storage devices.

One or more implementations can include the following optional features. For example, in some implementations, the multiple geographic regions comprise at least a neighborhood encompassing the location, a sub-locality encompassing an entire area of the neighborhood, and a locality encompassing an entire area of the neighborhood.

In some implementations, the neighborhood is associated with a first feature score, the sub-locality is associated with a second feature score, and the locality is associated with a third feature score, the first feature score having a value greater than a value of the second feature score and the value of the second feature being greater than a value of the third feature score, and the representative transcription is selected based at least on the respective values of the first feature score, the second feature score, and the third feature score.

In some implementations, selecting the set of n-grams that are associated with each of the multiple geographic regions includes, for each of the neighborhood, sub-locality, and the locality: obtaining a collection of n-grams determined to be associated with a region, computing, for each n-gram within the collection of n-grams, (i) a first score reflecting a probability that an n-gram will be used by a particular user at the location associated with the user, and (ii) a second score reflecting a probability that the n-gram will be used by a collection of users, identifying a subset of n-grams within the collection of n-grams that each have a first score that is greater than the second score, and selecting the subset of n-grams for the region.

In some implementations, the representative transcription is selected based at least on the respective values of the first scores of n-grams included within each of the one or more additional candidate transcriptions.

In some implementations, the set of n-grams selected for each of the multiple geographic regions are entity terms representing names of points of interest within the corresponding region.

In some implementations, the set of n-grams selected for each of the multiple geographic regions are entity terms that are included in one or more queries previously submitted by the user.

In some implementations, the method further includes biasing, by the automated speech recognizer, speech recognition of the utterance using the representative transcription.

In some implementations, the one or more additional candidate descriptions generated for the one or more of the multiple geographic regions include corrected transcriptions for each of one or more candidate transcriptions that are identified as incorrect transcriptions for the utterance.

In some implementations, selecting the set of n-grams for each of the multiple geographic regions includes: comparing waveforms associated with one or more of the n-grams that occur in the initial candidate transcription and waveforms associated with one or more n-grams for each of the multiple geographic regions; and determining, based on comparing waveforms associated with one or more of the n-grams that occur in the initial candidate transcription and waveforms associated with one or more n-grams for each of the multiple geographic regions, that at least one n-gram from among the one or more n-grams for each of the multiple geographic regions is phonetically similar a term that occurs in the initial candidate transcriptions.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

Voice queries that include entity terms such as unique names of local restaurants are often misrecognized because they contain rare terms that are relevant only in specific locations, users, time or combinations of context data. General voice recognition techniques that do not include location data often fail to distinguish between terms that are commonly used in different user locations, and as a result, provide inaccurate transcriptions of a voice query.

Accordingly, techniques described in this specification improve voice recognition accuracy by generating multiple location-specific transcription candidates for a voice query based on data indicating a user location. For instance, prior queries submitted by users at a specified location can be extracted from various data sources such as, for example, previously submitted search queries, voice queries, or other types of user activity data. The extracted data can then be aggregated into different hierarchical region models that each specify a collection of terms for geographic regions of different sizes that are associated with the location, e.g., neighborhood, sub-locality, and a locality. As a result, terms that are only likely to be used in smaller regions such are stored within a neighborhood model, whereas terms that are likely to be used more globally are stored within a sub-locality model or a locality model. The collections of terms associated with each of the multiple region models can then be used to generate alternate transcriptions for a query subsequently transmitted a specified location.

Figure 1:
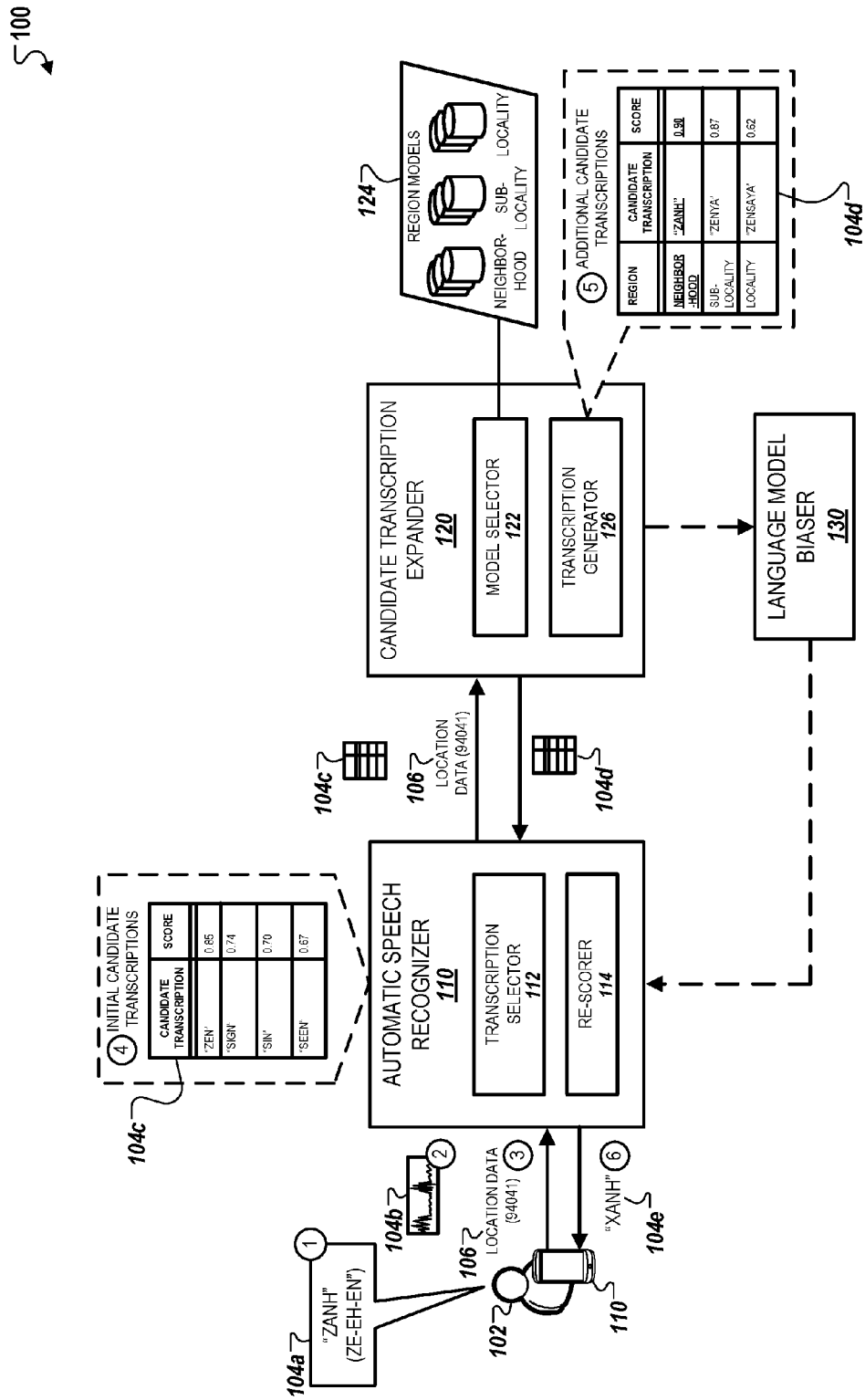
FIG. 1 illustrates an exemplary system that may be used for hierarchical location-based voice query recognition.

FIG. 1 illustrates an exemplary system 100 that may be used for location-based voice query recognition. In general, a user 102 provides a voice query 104a, encoded as audio data 104b, to the system 100, which then generates a list of initial candidate transcriptions 104c. The system 100 also receives location data 106, which is used to generate a list of additional candidate transcriptions 104d, select a representative candidate transcription 104e from among the list of additional candidate transcriptions 104d, and provide a recognition output 104f for output in response to the voice query 104a.

Briefly, the system 100 may include an automated speech recognizer (ASR) 110 that includes a transcription selector 112 and a re-scorer 114, a candidate transcription expander 120 that includes a model selector 122, regional models 124, and a transcription generator 126, and a language model biaser 130. More particular details about the operations performed by the system 100 are described below.

In more detail, the user 102 initially provides a voice query 104a, which is then encoded as audio data 104b. In the example in FIG. 1, the user 102 provides a voice query that includes the term "ZANH," which is the name of a fictional restaurant in Mountain View, Calif.

The ASR 110 receives the audio data 104b encoding the voice query 104a and generate a list of initial candidate transcriptions 104c for an utterance corresponding to the audio data 104b. The list 104c includes n-grams within a language model that are determined to be phonetically similar to the term "ZANH" included within the voice query 104a. In the example in FIG. 1, the ASR 110 generates initial candidate transcriptions "ZEN," "SIGN," "SIN," and "SEEN" based on the inferred phonetics of the voice query "ZANH." In this example, the ASR 110 generates such initial candidate transcriptions because the acoustic model and the language model indicate that this is the most likely recognition candidate without receiving data indicating a user location. For instance, as shown, the ASR 110 may use the acoustic model and the language model to generate incorrect initial candidate transcriptions because the language model may indicate that "ZEN" is the most likely transcription for the utterance "ZE-EH-EN" (shown in voice query 104a).

The candidate transcription expander 120 receives the list of initial candidate transcriptions 104c and additionally receive location data 106. The location data 106 may indicate a current user location based on a global positioning system (GPS) signal from a user device 110, and information related to the current user location. For example, the location data 106 may include terms associated with the current user location, such as names of nearby establishments, popular queries associated with the current user location, or previously submitted queries when the user 102 was last nearby the current location.

In some implementations, the location data 106 may also include context data obtained from previous user sessions such as previous search engine results from previous queries such as, for example, knowledge panels, lists, answers, or other types of information related to previous queries. In other instances, the context data may include recently clicked webpages, screen tracking data that indicates user behavior on a user interface such as, for example, click-tracking activity, amount of time spent on particular screens, or other types of user interaction. In such instances, the location data 106 may include n-grams that are associated with the user activity data.

In some implementations, the location data 106 may additionally or alternatively be extracted from a user profile that indicates user preferences that are determined based on the frequency of previously submitted voice queries, for example, commonly searched restaurants. The user profile may also indicate previous searches that include entity terms such as names of celebrities or popular locations, or different types of user activity data that represent user preferences such as, for example, "pinning" a location or setting a webpage as a "favorite."

In the example depicted in FIG. 1, the candidate transcription expander 120 receives location data 106 that specifies a zip code, "94041," which indicates that the current location of the user is in Mountain View, Calif. The model selector 122 of the candidate transcription expander 120 then uses the current user location to identify and select one or more models for geographical regions that are each associated with the user location.

Each model includes a collection of n-grams that are predetermined to be associated with a geographic region specified by the particular model. For example, the n-grams represent entity terms that correspond to, for example, names of regions of interest within the geographic region (e.g., names of businesses, neighborhood names etc.). As described more particularly with respect to FIG. 2, the models may be hierarchal such that some models specify n-grams that are associated with a small geographic region such as a neighborhood (e.g., Mountain View, Calif.), whereas other models specify n-grams that are associated with a larger geographic region such as a sub-locality (e.g., State of California), and other models that specify n-grams that are associated with an entire locality (e.g., the United States of America).

Although region models are described throughout in reference to three levels (e.g., neighborhood, sub-locality, and locality) for simplicity, in some implementations, the system 100 is capable of using a greater or smaller number of hierarchical levels based on the particular voice query that is received from the user device 110. For example, in one particular implementation, the system 100 may include models for a neighborhood, a sub-locality, a locality, and an administrative area. In addition, while the descriptions throughout are in reference to a single country (e.g., the United States), the system 100 may also be capable of aggregating global data for multiple counties. In this regard, the region hierarchy may include region models for different regions within a particular country, different regions within a particular continent, or different regions within the entire globe.

The different models can be used to adjust the selection of terms based on a designated specificity associated with each model. For example, a neighborhood model can include n-grams that are more likely used by users within a particular location based on the territorial boundaries for the geographic region being smaller (and thus, more specific) compared to the n-grams that are included within a sub-locality or locality models. As described in more detail below, the geographical classifications of the models can be further used to adjust the selection of n-grams to be included within additional candidate transcriptions for the voice query 104a.

In some implementations, the different hierarchies of models for a certain geographic locality can be inclusive of one another. For example, a locality model for the United States can include all n-grams that are determined to be associated with the United States, a sub-locality model for California can include a subset of the n-grams within the locality model that are determined to be associated only with California, and the neighborhood model for Mountain View can include a subset of the n-grams within the sub-locality model that are determined to be associated with Mountain View. In this example, n-grams that are included within the neighborhood model are also included within the sub-locality and locality models. In addition, there are some n-grams that may be included within the sub-locality and/or locality models but are not included within the neighborhood model (e.g., terms associated with Sacramento, Calif.). Thus, the different hierarchies can be used to generate alternate transcription sequences with different regional specificities with similar phonetic similarities.

In some implementations, the regional models 124 may periodically be updated with information transmitted from a mapping database that associates certain n-grams with hierarchies of different geographic regions. For instance, as described more particularly with respect to FIG. 2, n-grams previously used by a collection of users at specified locations may be aggregated in order to identify specific n-grams that are either neighborhood-specific (e.g., more likely to be used only by users within a particular neighborhood), sub-locality-specific, or locality-specific. This is accomplished by processing and correlating location data in relation to user query data for the collection of users. In this regard, the updates to the regional models 124 can be used to reflect changes in usage of n-grams (e.g., local usage to global usage or vice versa).

The model selector 122 selects different models such that the collection of n-grams specified by each of the selected models can then be used to generate additional candidate transcriptions for the voice query 104a. In some implementations, the user location indicated by the location data 106 is used to identify a corresponding model within each region hierarchy (e.g., a best-matched neighborhood model, a best-matched sub-locality model, and a locality model that includes both), and then process the different collections of n-grams specified by each region model in parallel. In other implementations, the model selector 122 may instead select multiple models for each type of model within the region hierarchy. In such implementations, the model selector 122 may a neighborhood model that includes the user location as well as other neighborhood models for neighborhoods that are nearby the neighborhood that includes the user location. Likewise, the model selector 122 may also select multiple sub-locality, and/or multiple locality models.

The transcription generator 126 uses the set of n-grams specified by each of the region models selected by the model selector 122 and then generates one or more additional candidate transcriptions for each of the selected region models. In the example shown in FIG. 1, the transcription generator 126 generates a single additional candidate transcription for each of the neighborhood model, the sub-locality model, and the locality model selected based on the user location specified by the location data 106. In other examples, the transcription generator 126 may select multiple additional candidate transcriptions for each model.

The transcription generator 126 generate the additional candidate transcriptions included within the table 104d based on comparing the collection of n-grams specified by each of the region models to the initial candidate transcriptions included within the table 104c. For each region model, the transcription generator 126 then generates one or more additional candidates that include n-grams from the collection of n-grams for the region model that (i) do not occur within the table 104c, and (ii) are indicated as being phonetically similar to the terms that do occur within the table 104c. As an example, for the neighborhood model, the transcription generator 126 identifies "XAHN" as an additional candidate transcription because this n-gram was not identified within the table 104c as an initial candidate transcription but is phonetically similar to the initial candidate transcription "ZEN."

The transcription generator 126 may additionally compute a recognition score for each of the additional candidate transcriptions generated for the selected region models. The recognition score can be used to reflect a likelihood that the additional candidate transcription reflects an accurate transcription of the voice query 104a. In some implementations, the recognition score is computed based on comparing the probability that a particular n-gram specified within a regional model is likely to be used by a user within the geographical region specified by the model, and the global probability that the particular n-gram is likely to be used by any user within any location (e.g., a probability indicated within a baseline language model used by the ASR 110). In this regard, the recognition score enables the system 100 to compare the usage of n-grams within different geographic regions relative to global usage to determine whether a likelihood of an additional candidate recognition is highly likely to be an accurate transcription for the voice query 104b given the user's present location.

The ASR 110 receives the list of additional candidate transcriptions 104d and selects a representative candidate transcription for output as the recognition output 104e. For instance, in some implementations, the ASR 110 may initially generate respective confidence scores for each of the initial transcriptions within the list 104c and the additional candidate transcriptions within the list 104d. The confidence score may represent the likelihood that each particular candidate transcription represents an accurate transcription of the voice query 104a. As shown in the example in FIG. 1, the ASR 110 determines, based on both the audio data 104b and the location data 106, a low confidence score for the initial candidate transcription "ZEN" because of the current user location indicated by zip code in the location data 106. Alternatively, the ASR 110 determines a high confidence score for the additional candidate transcription "ZANH" because it is phonetically similar to the audio data 104b and because the term "ZANH" is associated with the zip code in the location data 106.

In more detail, transcription selector 112 initially selects a particular candidate transcription for output from among the initial candidate transcriptions and the additional candidate transcriptions that represents the candidate transcription that is most likely to represent an accurate transcription. For instance, the transcription selector 112 may compare the respective confidence scores assigned to each of the initial candidate transcription and the additional candidate transcription, and select the particular candidate transcription with the highest confidence score. As shown in the example in FIG. 1, the transcription selector 112 chooses the additional candidate transcription "ZANH" for this transcription having a higher confidence score given the location data 106 indicating the current location of the user 102. The ASR 110 then provides the recognition output 104e as "ZANH" based on selecting the additional candidate transcription.

In some implementations, the ASR 110 may additionally include the re-scorer 114, which rescores the confidence scores calculated by ASR 110 for each particular candidate transcription. For instance, the re-scorer 114 may additionally compare the phonetic similarity between each of candidate transcription and the audio data 104b to determine which individual candidate transcription represents the transcription that is most likely to be the correct transcription. For example, if the audio data 104b includes significant amounts of noise, the re-scorer 114 may adjust the confidence scores assigned to each of the initial candidate transcription 104c and the additional candidate transcription 104d such that the ASR 110 appropriately select the candidate transcription that is most likely to be an accurate transcription.

Although FIG. 1 illustrates that the representative candidate transcription as being selected by the ASR 110, in other implementations, the representative candidate transcription may alternatively be selected by the candidate transcription expander 120. For example, in such implementations, the transcription generator 126 may also perform the operations of the transcription selector 112 to in order to provide the ASR 110 with a representative transcription that is determined to be the most accurate transcription for the voice query 104a. In this example, processing of additional candidate transcriptions 104d is externalized from the ASR 110 such that the ASR 110 only transmits the representative transcription selected by the candidate transcription expander 120 for output to the user device 110.

In some implementations, the representative transcription may additionally or alternatively be selected based on biasing a baseline language model used by the ASR 110 to generate recognition outputs for the voice query 104a. For example, the n-grams included within the table 104d can be sent to the language model biaser 130 to positively bias the baseline language model such that there is an increased probability that such n-grams are selected as a candidate transcription sequence by the ASR 110. In such examples, the language model biaser 130 may increase the baseline probability of a particular n-gram using Equation (1), below:

$$LMBoost = \log[P(n\text{-gram}|location)] - \log[P(n\text{-gram})] + FS \quad (1)$$

In Equation (1), LMBoost represents positive bias to the baseline language model probability for a particular n-gram, P(n-gram|location) represents the probability of the n-gram being used at the user location indicated by the location data 106, P(n-gram) represents the probability of the n-gram within the baseline language model, and FS represents a feature score associated with a region model that includes the n-gram.

The value of the feature scores can be used to adjust the biasing of individual n-grams included within the table 104d based on the associated region models. For example, a neighborhood model may be associated with a larger feature score compared to a local model such that an n-gram identified within the neighborhood model is more heavily biased compared to a related n-gram identified within the locality module. In this example, n-grams from neighborhood models are more heavily biased because the neighborhood model is associated with a smaller geographic region, increasing the probability that a user within the user location indicated by the location data 106 is likely to use an n-gram from the neighborhood model compared to a related n-gram from the locality model.

Figure 2:
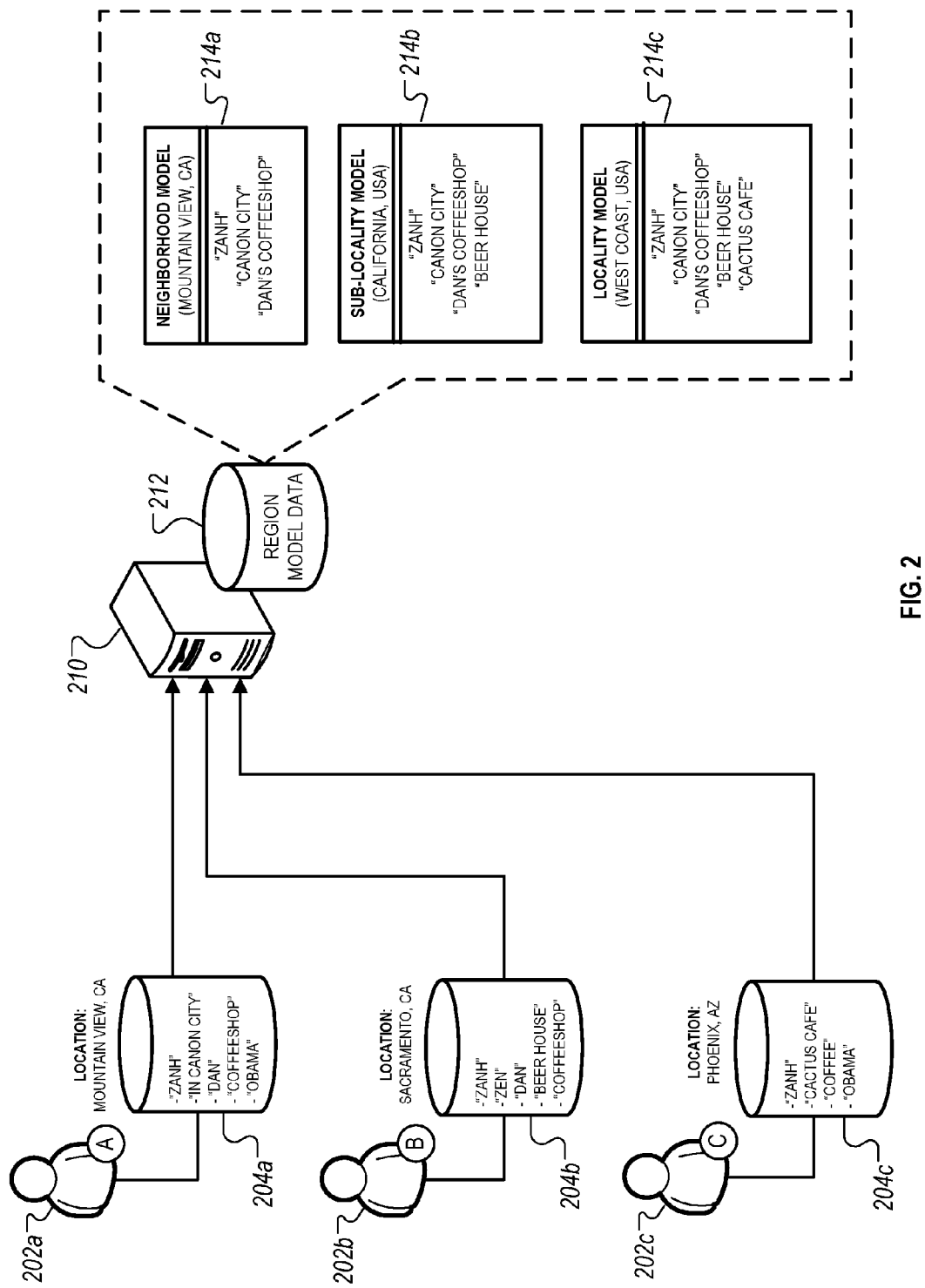
FIG. 2 illustrates an exemplary process for generating hierarchal region models used to improve voice query recognition.

FIG. 2 illustrates an exemplary process 200 for generating hierarchical region models used to improve voice query recognition. Briefly, the process 200 can be executed by a server 210 that obtains query log data 204a, 204b, and 204c for users 202a, 202b, and 202c, respectively. The server 210 processes and aggregates the n-grams identified within the query log data 204a, 204b, and 204c into storage 212. The server 210 then categorizes the identified n-grams in order to generate a set of region models (e.g., the region models 124) that includes a neighborhood model 214a, a sub-locality model 214b, and a locality model 214c.

In more detail, the region models can correspond to geographic regions of different sizes such that each model specifies a collection of n-grams associated with a different region size. In the example depicted, a neighborhood model 214a specifies a collection of entity n-grams that are all associated with "Mountain View, Calif.," a sub-locality model 214b specifies a collection of entity n-grams that are all associated with "California, USA," and a locality model 214c specifies a collection of entity n-grams that are all associated with the "West Coast" region of the United States that includes multiple states.

The server 210 initially obtains query log data 204a, 204b, and 204c associated with the users 202a, 202b, and 202c, respectively. As described above, the query log data can include historical data such as voice or text queries submitted by the users 202a-c, among other types of data such as search query data, or application input data. The query log data include a collection of n-grams that were included within the historical data associated with each user.

The server 210 performs various processing operations in order to select n-grams that are extracted from the query log data and stored in the storage 212. For example, the server 210 may annotate text segments to extract entity n-grams and remove non-entity n-grams. For instance, in the example, the text segment "IN CANON CITY" is annotated to extract "CANON CITY" and remove "IN."

In addition, the server 210 uses various heuristics to filter out n-grams that are not to be included within the region models. For example, the server 210 may filter out misspellings, n-grams that only few users use, and/or n-grams that are only popular within the location due to misrecognitions. For instance, in the example, the n-gram "OBAMA" is removed from the query log data since its frequency of usage by all users is higher than a specified threshold for including within a region model. In another example, server 210 may filter out n-grams where the ratio of correctly spelled queries to incorrectly spelled queries within a location is below a threshold, indicating that the n-gram is due to a common misrecognition error across all users. In another example, the server 210 may filter not n-grams where the different between the subset spell-correction-ratio and global spell-correction-ratio exceed a threshold, indicating that the n-gram is a local spelling error. In yet another example, the server 210 may also filter out n-grams that were included in a lot of voice queries but not in text queries, indicating that the n-gram is only mistakenly recognized. In yet another example, the server 210 may filter out n-grams where the difference between the subset voice-ratio and the global voice-ratio is above a threshold, indicating that the n-gram is a local misrecognition, e.g., "canon city" being misrecognized as "canyon city."

In the example depicted, each of the users 202a, 202b, and 202c each submit queries in different locations, e.g., "Mountain View, Calif.," "Sacramento, Calif.," and "Phoenix." Based on these locations, the server 210 generates the neighborhood model 214a such that it only includes n-grams obtained from the query log 204a. In addition, because the user 202a and the user 202b, but not the user 202c, are located in California, the sub-locality model 214b includes terms from the query logs 204a and 204b but not from the query log 204c. Finally, since all of the users 202a, 202b, and 202c are located on the west coast of the United States, e.g., California and Arizona, the locality model 214c includes n-grams obtain from each of the query logs 204a, 204b, and 204c.

Figure 3:
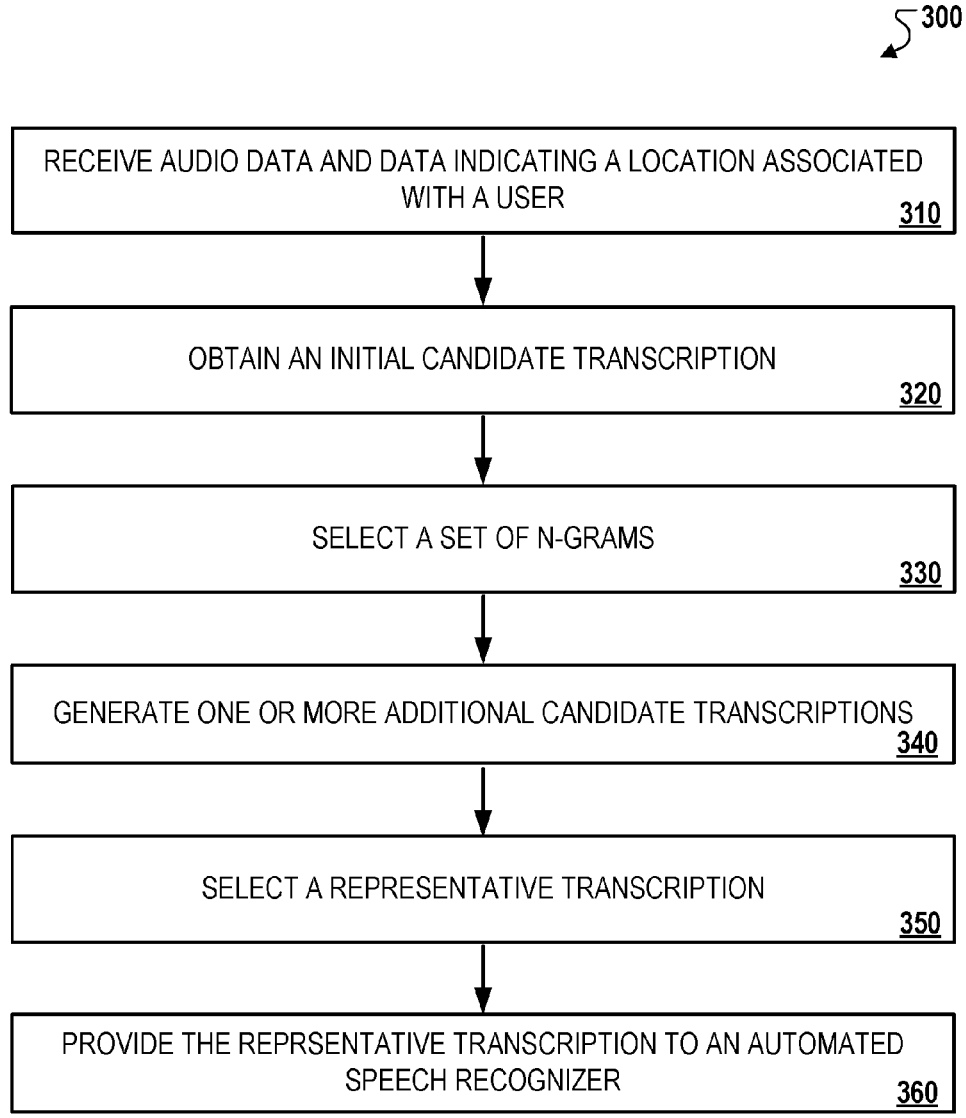
FIG. 3 illustrates an exemplary process for improving voice query recognition using hierarchal region models.

FIG. 3 illustrates an exemplary process 300 for improving voice query recognition using hierarchical region models. Briefly, the process 300 may include receiving audio data and data indicating a location associated with a user (310), obtaining an initial candidate transcription (320), selecting a set of n-grams (330), generating one or more additional candidate transcriptions (340), selecting a representative transcription (350), and providing the representative transcription to an automated speech recognizer (360).

In more detail, the process 300 may include receiving audio data and data indicating a location associated with a user (310). For instance, the ASR 110 may obtain the audio data 104b encoding an utterance of the voice query 104a submitted by the user 102 on the user device 110. The ASR 110 may also obtain location data 106 based on a GPS signal of the user device 110.

In some implementations, the ASR 110 may also obtain context data extracted from previous user sessions such as, for example, previous search queries, search engine results, or answers to voice queries. In other instances, the context data may be extracted from user activity data such as screen tracking data, recently clicked hyperlinks, or user profiles indicating preferences. The context may additionally or alternatively include a current user location and terms associated with the user location such as names of nearby locations, or common queries submitted by the user 102 or other users within the specified location.

The process 300 may include obtaining an initial candidate transcription (320). For example, the candidate transcription expander 120 may obtain an initial candidate transcription included within the list of initial candidate transcriptions 104c generated by the ASR 110. As described above, the initial candidate transcriptions can be identified by the ASR 110 based on an acoustic model and a language model used to recognize the voice query 104a.

The process 300 selecting a set of n-grams (330). For instance, the candidate transcription expander 120 may select a set of n-grams from among a collection of n-grams of each of the region models 124. In some implementations, the model selector 122 may initially select a neighborhood model, a sub-locality model, and a locality model based on the user location indicated by the location data 106. In other implementations, the model selector 122 may select multiple region models within the model hierarchy, e.g., multiple neighborhood models, multiple sub-locality models, and multiple locality models.

The process 300 may include generating one or more additional candidate transcriptions (340). For example, the candidate transcription expander 120 may generate additional candidate transcriptions for one or more of the region models selected by the model selector 122. The additional candidate transcriptions that are generated by the transcription generator 126 can then be included within the table 104d. As described above, each additional candidate includes n-grams that were not included within the list of initial candidate transcriptions 104c, and that are indicated as being phonetically similar to one of more terms that do exist within the list of initial candidate transcriptions 104c.

The process 300 may include selecting a representative transcription (350). For example, either the ASR 110 and/or the candidate transcription expander 120 may select a representative transcription from among the initial candidate transcriptions in the table 104c and the additional candidate transcriptions in the table 104d. As described above, the selection may be based on the respective confidence scores for each of the individual candidate transcriptions. In some implementations, prior to the selection of the representative transcription, the computed confidence scores for the initial candidate transcriptions within the table 104c may be adjusted based on the generation of the additional candidate transcription scores. In such implementations, the candidate transcription with the greatest confidence score is then selected as the representative transcription.

In some implementations, the representative transcription is based on biasing a baseline language model used by the ASR 110 to generate a recognition output for the voice query 104a. For instance, as described above, n-grams within the additional candidate transcriptions may be sent to the language model biaser 130 to positively bias the baseline language model to increase the respective probabilities associated with the n-grams included within the additional candidate transcriptions. The language model biaser 130 may positively bias the baseline language model based on computing a language probability boost according to equation (1) described above. In such implementations, a respective probability within the baseline language model may be increased if the probability of an n-gram being used within a geographic region specified by a region model is greater than the probability of the n-gram within the language model.

The process 300 may include providing the representative transcription to an automated speech recognizer (360). For example, the candidate transcription expander 120 may provide the representative transcription to the ASR 110. The representative transcription can then be used by the ASR 110 to generate the recognition output 104e.

Figure 4:
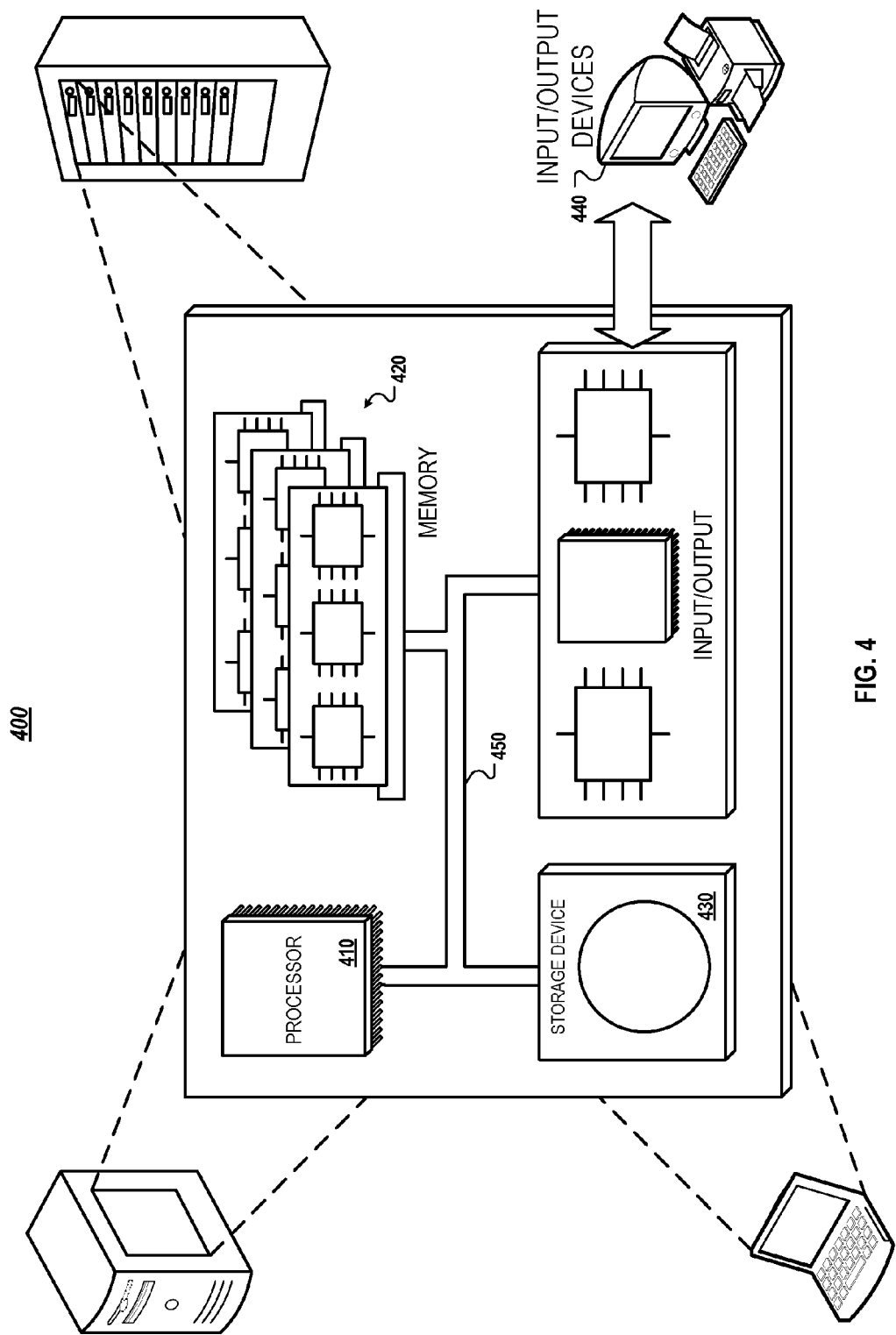
FIG. 4 is a block diagram of computing devices on which the processes described herein, or portions thereof, may be implemented.

FIG. 4 is a schematic diagram of an example of a generic computer system 400. The system 400 can be used for the operations described in association with FIGS. 1-6 according to some implementations. The system 400 may be included in the systems 100 and 200.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
receiving, by a voice query processing system that includes (a) an automated speech recognizer (ASR), (b) a candidate transcription expander, and (c) a search engine, (i) audio data corresponding to an utterance of the user, and (ii) data indicating a location associated with a user;
obtaining, based on processing the audio data by ASR of the voice query processing system, an initial candidate transcription of the utterance;
selecting, by the candidate transcription expander of the voice query processing system and for each of multiple geographic regions that are associated with the location, a set of n-grams that represent names of entities that are pre-associated with the geographic region;
for one or more of the multiple geographic regions, generating, by the candidate transcription expander of the voice query processing system and based on the set of n-grams that represent names of entities that are pre-associated with the geographic region, one more additional candidate transcriptions that are indicated as phonetically similar to one or more terms that do occur in the initial candidate transcription that is obtained by the ASR and that do not occur in the initial candidate transcription that is obtained by the ASR;

selecting, by the ASR of the voice query processing system, from among the one or more additional candidate transcriptions that were generated by the candidate transcription expander and that are indicated as phonetically similar to one or more terms that do occur in the initial candidate transcription that is obtained by the ASR and that do not occur in the initial candidate transcription that is obtained by the ASR, a representative transcription of the utterance based on a phonetic similarity of the candidate transcriptions to the audio data;

providing, by the voice query processing system, the representative transcription that was generated by the candidate transcription expander and that is indicated as phonetically similar to one or more terms that do occur in the initial candidate transcription that is obtained by the ASR and that does not occur in the initial candidate transcription that is obtained by the ASR for output as a likely most accurate transcription generated by the ASR; and processing the representative transcription as a query by the search engine to generate one or more search engine results.

2. The method of claim 1, wherein the multiple geographic regions comprise at least a neighborhood encompassing the location, a sub-locality encompassing an entire area of the neighborhood, and a locality encompassing an entire area of the neighborhood.

3. The method of claim 2, wherein:
the neighborhood is associated with a first feature score, the sub-locality is associated with a second feature score, and the locality is associated with a third feature score, the first feature score having a value greater than a value of the second feature score and the value of the second feature being greater than a value of the third feature score, and
the representative transcription is selected based at least on the respective values of the first feature score, the second feature score, and the third feature score.

4. The method of claim 2, wherein selecting the set of n-grams that represent names of entities that are pre-associated with the geographic region comprises:
for each of the neighborhood, sub-locality, and the locality:
obtaining a collection of n-grams determined to be associated with a region,
computing, for each n-gram within the collection of n-grams, (i) a first score reflecting a probability that an n-gram will be used by a particular user at the location associated with the user, and (ii) a second score reflecting a probability that the n-gram will be used by a collection of users,
identifying a subset of n-grams within the collection of n-grams that each have a first score that is greater than the second score, and
selecting the subset of n-grams for the region.

5. The method of claim 4, wherein the representative transcription is selected further based at least on the respective values of the first scores of n-grams included within each of the one or more additional candidate transcriptions.

6. The method of claim 1, the set of n-grams selected for each of the multiple geographic regions are entity terms that are included in one or more queries previously submitted by the user.

7. The method of claim 1, comprising:
biasing, by the automated speech recognizer, speech recognition of the utterance using the representative transcription.

8. The method of claim 1, wherein the one or more additional candidate descriptions generated for the one or more of the multiple geographic regions include corrected transcriptions for each of one or more candidate transcriptions that are identified as incorrect transcriptions for the utterance.

9. The method of claim 1, wherein selecting the set of n-grams that represent names of entities that are pre-associated with the geographic region comprises:
comparing waveforms associated with one or more of the n-grams that occur in the initial candidate transcription and waveforms associated with one or more n-grams for each of the multiple geographic regions; and
determining, based on comparing waveforms associated with one or more of the n-grams that occur in the initial candidate transcription and waveforms associated with one or more n-grams for each of the multiple geographic regions, that at least one n-gram from among the one or more n-grams for each of the multiple geographic regions is phonetically similar a term that occurs in the initial candidate transcriptions.

10. A voice query processing system including (a) an automated speech recognizer (ASR), (b) a candidate transcription expander, and (c) a search engine, the voice query processing system comprising:
one or more computers; and
one or more data storage devices storing instructions that are operable, when executed by the one or more computers, to cause the one or more computers to perform operations comprising:
receiving (i) audio data corresponding to an utterance of the user, and (ii) data indicating a location associated with a user;
obtaining, based on processing the audio data by the ASR of the voice query processing system, an initial candidate transcription of the utterance;
selecting, by the candidate transcription expander of the voice query processing system and for each of multiple geographic regions that are associated with the location, a set of n-grams that represent names of entities that are pre-associated with the geographic region;
for one or more of the multiple geographic regions, generating, by the candidate transcription expander of the voice query processing system and based on the set of n-grams that represent names of entities that are pre-associated with the geographic region, one more additional candidate transcriptions that are indicated as phonetically similar to one or more terms that do occur in the initial candidate transcription that is obtained by the ASR and that do not occur in the initial candidate transcription that is obtained by the ASR;
selecting, by the ASR of the voice query processing system, from among the one or more additional candidate transcriptions that were generated by the candidate transcription expander and that are indicated as phonetically similar to one or more terms that do occur in the initial candidate transcription that is obtained by the ASR and that do not occur in the initial candidate transcription that is obtained by the ASR, a representative transcription of the utterance based on a phonetic similarity of the candidate transcriptions to the audio data;

providing, by the voice query processing system, the representative transcription that was generated by the candidate transcription expander and that is indicated as phonetically similar to one or more terms that do occur in the initial candidate transcription that is obtained by the ASR and that does not occur in the initial candidate transcription that is obtained by the ASR for output as a likely most accurate transcription generated by the ASR; and processing the representative transcription as a query by the search engine to generate one or more search engine results.

11. The system of claim 10, wherein the multiple geographic regions comprise at least a neighborhood encompassing the location, a sub-locality encompassing an entire area of the neighborhood, and a locality encompassing an entire area of the neighborhood.

12. The system of claim 10, wherein:
the neighborhood is associated with a first feature score, the sub-locality is associated with a second feature score, and the locality is associated with a third feature score, the first feature score having a value greater than a value of the second feature score and the value of the second feature being greater than a value of the third feature score, and the representative transcription is selected based at least on the respective values of the first feature score, the second feature score, and the third feature score.

13. The system of claim 10, wherein selecting the set of n-grams that represent names of entities that are pre-associated with the geographic region comprises:
for each of the neighborhood, sub-locality, and the locality:
  obtaining a collection of n-grams determined to be associated with a region,
  computing, for each n-gram within the collection of n-grams, (i) a first score reflecting a probability that an n-gram will be used by a particular user at the location associated with the user, and (ii) a second score reflecting a probability that the n-gram will be used by a collection of users,
  identifying a subset of n-grams within the collection of n-grams that each have a first score that is greater than the second score, and
  selecting the subset of n-grams for the region.

14. The system of claim 13, wherein the representative transcription is selected further based at least on the respective values of the first scores of n-grams included within each of the one or more additional candidate transcriptions.

15. A non-transitory computer-readable medium storing software comprising instructions executable by one or more computers which, upon such execution, cause the one or more computers to perform operations comprising:
receiving, by a voice query processing system that includes (a) an automated speech recognizer (ASR), (b) a candidate transcription expander, and (c) a search engine, (i) audio data corresponding to an utterance of the user, and (ii) data indicating a location associated with a user;
obtaining, based on processing the audio data by ASR of the voice query processing system, an initial candidate transcription of the utterance;

selecting, by the candidate transcription expander of the voice query processing system and for each of multiple geographic regions that are associated with the location, a set of n-grams that represent names of entities that are pre-associated with the geographic region;

for one or more of the multiple geographic regions, generating, by the candidate transcription expander of the voice query processing system and based on the set of n-grams that represent names of entities that are pre-associated with the geographic region, one more additional candidate transcriptions that are indicated as phonetically similar to one or more terms that do occur in the initial candidate transcription that is obtained by the ASR and that do not occur in the initial candidate transcription that is obtained by the ASR;

selecting, by the ASR of the voice query processing system, from among the one or more additional candidate transcriptions that were generated by the candidate transcription expander and that are indicated as phonetically similar to one or more terms that do occur in the initial candidate transcription that is obtained by the ASR and that do not occur in the initial candidate transcription that is obtained by the ASR, a representative transcription of the utterance based on a phonetic similarity of the candidate transcriptions to the audio data;

providing, by the voice query processing system, the representative transcription that was generated by the candidate transcription expander and that is indicated as phonetically similar to one or more terms that do occur in the initial candidate transcription that is obtained by the ASR and that does not occur in the initial candidate transcription that is obtained by the ASR for output as a likely most accurate transcription generated by the ASR; and processing the representative transcription as a query by the search engine to generate one or more search engine results.

16. The medium of claim 15, wherein the multiple geographic regions comprise at least a neighborhood encompassing the location, a sub-locality encompassing an entire area of the neighborhood, and a locality encompassing an entire area of the neighborhood.

17. The medium of claim 16, wherein:
the neighborhood is associated with a first feature score, the sub-locality is associated with a second feature score, and the locality is associated with a third feature score, the first feature score having a value greater than a value of the second feature score and the value of the second feature being greater than a value of the third feature score, and the representative transcription is selected based at least on the respective values of the first feature score, the second feature score, and the third feature score.

18. The medium of claim 16, wherein selecting the set of n-grams that represent names of entities that are pre-associated with the geographic region comprises:
for each of the neighborhood, sub-locality, and the locality:
  obtaining a collection of n-grams determined to be associated with a region,
  computing, for each n-gram within the collection of n-grams, (i) a first score reflecting a probability that an n-gram will be used by a particular user at the location associated with the user, and (ii) a second score reflecting a probability that the n-gram will be used by a collection of users, identifying a subset of n-grams within the collection of n-grams that each have a first score that is greater than the second score, and selecting the subset of n-grams for the region.

* * * * *